(12) United States Patent
Noack

(10) Patent No.: US 7,704,336 B2
(45) Date of Patent: Apr. 27, 2010

(54) METHOD FOR TREATING MOLTEN METAL

(75) Inventor: Hans-Peter Noack, Bochum (DE)

(73) Assignee: Metakon GmbH, Bochum (DE)

( * ) Notice: Subject to any disclaimer, the term of this patent is extended or adjusted under 35 U.S.C. 154(b) by 350 days.

(21) Appl. No.: 11/597,009

(22) PCT Filed: May 6, 2005

(86) PCT No.: PCT/EP2005/004948

§ 371 (c)(1),
(2), (4) Date: Nov. 17, 2006

(87) PCT Pub. No.: WO2005/115661

PCT Pub. Date: Dec. 8, 2005

(65) Prior Publication Data

US 2007/0251608 A1    Nov. 1, 2007

(30) Foreign Application Priority Data

May 19, 2004    (WO) ................ PCT/EP2004/005417

(51) Int. Cl.
B22D 17/00    (2006.01)
(52) U.S. Cl. ........................................ 148/538; 75/305
(58) Field of Classification Search ................... 148/538; 75/305; C23C 2/30
See application file for complete search history.

(56) References Cited

U.S. PATENT DOCUMENTS 4,842,647 A    6/1989    Ichikawa et al.

5,366,535 A    11/1994    Heaslip et al.

FOREIGN PATENT DOCUMENTS

CN    1 349 868 A    5/2002

(Continued)

OTHER PUBLICATIONS

Corma, Avelino et al., "New Aluminosilicate and Titanosilicate Delaminated Materials Active for Acids Catalysis, and Oxidation Reactions Using $H_2O_2$," *J. Am. Chem Soc.*, 2000, vol. 122, pp. 2804-2809. XP 001018883 (ISR).

(Continued)

*Primary Examiner*—George Wyszomierski
*Assistant Examiner*—Weiping Zhu
(74) *Attorney, Agent, or Firm*—Collard & Roe, P.C.

(57) ABSTRACT

The invention relates to a method for treating molten metal that is contained in a metallurgical vessel, according to which a fine-grained blanket material containing silicon oxide and aluminium oxide is spread over the surface of the molten metal. The aim of the invention is to prevent the formation of dust and to facilitate the distribution of the blanket material over the surface of the molten metal. To achieve this, the blanket material consists of a synthetic zeolite material, which contains essentially equal fractions of silicon oxide and aluminium oxide. Said blanket material comprises a close grain-size distribution, in such a way that less than 20% of the grains have a diameter of less than 30 μm or greater than 125 μm. According to an additional embodiment of the invention, a vegetable ash, in particular a rice chaff ash, can be added to the blanket material.

13 Claims, 1 Drawing Sheet

FOREIGN PATENT DOCUMENTS

| | | |
|---|---|---|
| DE | 37 42 415 C1 | 12/1988 |
| DE | 197 28 368 C1 | 3/1999 |
| DE | 19728368 C1 * | 3/1999 |
| DE | 101 24 926 A1 | 11/2002 |
| DE | 10124926 A1 * | 11/2002 |
| GB | 2 265 564 A | 10/1993 |
| WO | WO 00/61319 A | 10/2000 |

OTHER PUBLICATIONS

International Search Report, Sep. 2005.

* cited by examiner

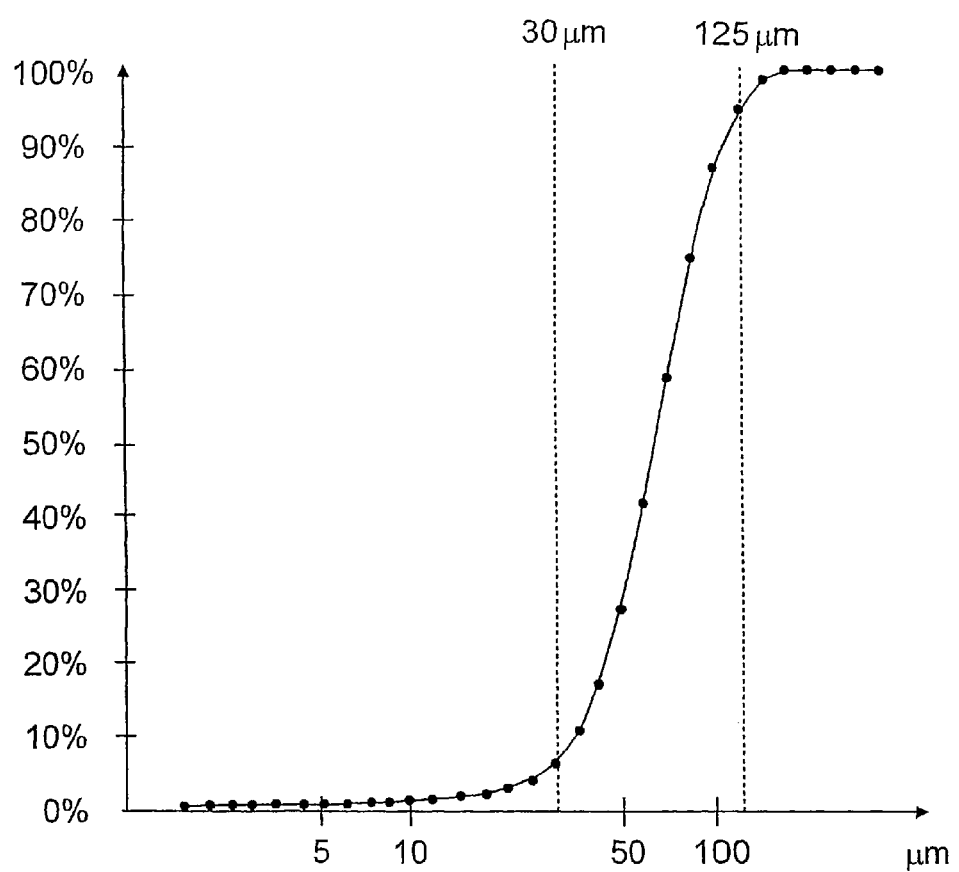

METHOD FOR TREATING MOLTEN METAL

CROSS REFERENCE TO RELATED APPLICATIONS

Applicant claims priority under 35 U.S.C. §119 of European Application No. PCT/EP04/005417 filed May 19, 2004. Applicant also claims priority under 35 U.S.C. §365 of PCT/EP2005/004948 filed May 6, 2005. The international application under PCT article 21(2) was not published in English.

The invention relates to a method for treating molten metal that is contained in a metallurgical vessel, according to which a fine-grained blanket material containing silicon oxide and aluminium oxide is spread over the surface of the molten metal.

It is known practice to cover the surface of molten metal contained in metallurgical vessels with a layer of high-melting blanket material containing silicon oxide. This blanket serves, on the one hand, to protect the molten metal from being exposed to atmospheric gases (notably oxygen). On the other hand, the blanket provides effective heat insulation, thus slowing down the cooling process of the molten metal while it is being processed. Such blanketing processes are needed especially in foundries and steel mills, where they constitute the only means to effectively protect the molten metal by means of a blanket material that is applied to and spread over the surface of the melt.

It is generally known practice to use, for the above purposes, various fine-grained, powdery blanket materials, such as perlite or waste soot. Furthermore, the use of grainy ash of vegetable origin, notably rice chaff ash, admixed with a cellulose broth as an organic binder in the granulation process, such as paper pulp or pulp, is known from the prior art. Graphite and slag are used as additional aggregate materials in prior art blanket materials. Prior art blanket materials may also contain, among others, synthetic resins and colloidal silicic acid as additional binders.

A disadvantage of prior art vegetable-ash-based blanket materials lies in that their production requires a relatively complex process to impart to them the physical properties required for the intended purpose. In addition, a number of aggregate materials are required, which, in sum, makes the blanket material known from the prior art too expensive for use in the steel industry on a regular basis.

A further disadvantage involved in the use of conventional powdery blanket materials resides in their relatively low melting temperature of only 1100° C. to 1200° C. Due to their specific physical properties, the powders applied to the surface of the molten metal combine over time with the slag layer that floats on the surface as well. On the one hand, this leads to an undesirably significant increase in the amount of slag; on the other hand, the continuously deteriorating heat insulation causes the slag to harden as it cools down, which may clog up the melting vessels, so that extensive cleaning is required. Still another disadvantage of prior art blanket materials is their tendency to cake together to form a continuous layer on the surface of the molten metal and with the walls of the metallurgical vessels. The low melting temperature of prior art blanket materials has also the disadvantage of high material consumption.

A specific problem involved in blanketing molten metal in metallurgical vessels lies in that the prior art materials often lead to undesirable dust formation. Due to the extreme air convection in the space above the hot melt, even the smallest amounts of dust are dispersed into the environment in an uncontrollable manner.

Furthermore, the use of prior art materials for blanketing molten metal has a disadvantage in that these materials are often difficult to distribute on the surface of the molten metal. Blanketing the surface evenly often calls for the use of sophisticated and thus cost-intensive distribution devices.

Based on the above, the present invention provides a method for blanketing the surface of molten metal that avoids the afore-mentioned disadvantages. A specific requirement is that the application of the blanket material to the surface of the molten metal should cause as little dust formation as possible. Moreover, the blanket material used should have good heat insulation properties and be convenient to spread over the surface of the molten metal.

The invention meets this objective by using a method of the type mentioned above and a blanket material that consists of a synthetic zeolite material containing essentially equal fractions of silicon oxide and aluminium oxide, which blanket material has a close grain-size distribution with less than 20% of the grains measuring less than 30 μm or more than 125 μm in diameter.

Persons skilled in the art know that zeolites are microporous crystals which are made up of aluminium silicate matrices. Due to their high porosity, these materials have excellent heat insulation properties. Moreover, their low density makes sure that the fine-grained blanket material cannot sink down or combine with the slag floating on the molten metal, so that the formation of incrustations on the metallurgical vessels are effectively avoided. Furthermore, the low specific weight of the synthetic zeolite material makes sure that the blanket layer is safely separated from the liquid phase of the molten metal.

An essential aspect of the method according to the invention is that the fine-grained blanket material has the above mentioned close grain-size distribution. Owing to that close grain-size distribution, the powdery blanket material applied to the surface of the molten metal forms particularly large voids between the individual grains. These voids make for a further improvement in the heat insulation properties. Furthermore, a particular advantage lies also in the fact that the blanket material according to the invention shows excellent flow properties on the surface of the molten metal. Thus the blanket material spreads quasi by itself on the surface of the metal, so that there is no need for any kind of distribution devices. While the prior art blanket materials, after being applied to the surface of the molten metal, initially form cones on the surface, which then need to be spread with the aid of suitable distribution devices, the blanket material according to the invention starts to spread by itself to form an even layer on the entire surface of the molten metal. This behaviour, which is extremely advantageous for the process covered by the invention, is primarily based on the close grain-size distribution of the synthetic zeolite material. The flow characteristics of the blanket material are further improved, if these grains are essentially sphere-shaped and if their surface is as smooth as possible.

A blanket material suitable for the purpose of the invention is synthetic zeolite material, which is also known as equilibrium catalyst. It arises in large quantities as waste material from petrochemical processes. This zeolite material, which is used in the production of petrol from crude oil, can be made available at low cost for use in the process covered by the invention after undergoing a suitable conditioning treatment, if necessary. Here, a particular advantage lies in that large quantities of a waste material that would otherwise need to be disposed of in a complex process can be put to good use. To obtain the grain-size distribution required for the process covered by the invention, it may be necessary to suitably blend and/or classify the spent zeolite materials that arise in the chemical industry in different grain-sizes fractions.

Typical zeolite materials used in petrochemical applications consist of roughly equal fractions of aluminium oxide and silicon oxide. The other components usually contained in these materials do not affect the latter's suitability as melt blanket materials for the purpose of the invention. On the contrary, they are even advantageous for the process covered by the invention. If the ratio of aluminium oxide to silicon oxide is larger than one, there is an advantage in that such a blanket material has a particularly high melting temperature of approx. 1500° C. Another advantage is that, in the case of aluminium-killed steel melts, the silicon oxide cannot act as an oxygen source.

Practice has shown that the blanket material according to the invention may contain up to 1% each of titanium oxide, iron oxide, magnesium oxide and calcium oxide. These percentages do not significantly affect the use of the blanket material for the purpose contemplated by the invention.

The process according to the invention is particularly suitable for blanketing molten metal contained in a steel distributor or a steel casting ladle. In the case of a steel distributor (also known as tundish) or a steel casting ladle, where the molten metal remains for a relatively long time, effective heat insulation is an important requirement. In addition, in these vessels, the molten metal has a large surface that needs to blanketed. For this reason, the zeolite material according to the invention is particularly suitable given its excellent flow properties.

A further useful embodiment of the process according to the invention consists in applying the blanket powder to an intermediate layer of reactive calcium aluminate slag floating directly on the surface of the melt. In this two-layer blanket system, the reactive calcium aluminate slag serves to effectively protect the molten metal from being exposed to atmospheric gases. A further advantage of the calcium aluminate slag lies in that it plays a vital role in the pickup of undesirable non-metallic inclusions by the blanket layer from the melt. The synthetic zeolite material applied to the reactive slag ensures effective heat insulation.

According to the invention, a carbon source material, e.g. petroleum coke, may, where expedient, be added to the material used to blanket the molten metal in order to vary the melting properties of the blanket material. In this manner, petroleum coke, which is also a waste material from petrochemical processes, can be put to good use.

In practice, the blanket material can be applied particularly conveniently to the surface of the molten metal in plastic polymer bag portion packs. Due to the high temperatures in the area above the molten metal, which are well over 1000° C., the plastic polymer bags burn instantly. Subsequently the blanket material spreads by itself over the surface of the molten metal owing to its good flow properties. In this process, dust formation is effectively prevented, due to the fact that the grains of the blanket material according to the invention has a grain-size of at least 30 μm in diameter.

According to a useful further embodiment of the process according to the invention, the blanket material consists of up to 40% w/w of vegetable ash. A particularly suitable type of vegetable ash is the aforementioned rice chaff ash. The addition of vegetable ash has an advantage in that it further improves the insulating properties of the blanket powder. Moreover, vegetable ash is an carbon source material, which has a positive effect on the melting properties of the slag.

A significant disadvantage of using pure vegetable ash lies in that the ash changes into a fibrous crystal phase (crystobalite) at high temperatures. These crystal fibres are respirable and may cause cancer. This disadvantage can be reliably avoided through the use of the blend of vegetable ash and synthetic zeolite material as covered by the invention. With that blend, the formation of crystobalite is significantly reduced.

In practice, the use of a blend containing at least 60% w/w of zeolite material and up to 40% w/w of vegetable ash has proved particularly suitable for blanketing molten metal, the preferred blend being approx. 80% w/w of zeolite material and approx. 20% w/w of rice chaff ash. Such a blend has the advantage of being almost neutral, while conventional blanket materials are acidic and tend to attack the linings of the metallurgical vessels over time.

What is important in adding vegetable ash within the ranges mentioned above, is the fact that the excellent flow properties of the blanket material are ensured only if the grain-size distribution requirements according to the invention are observed.

An embodiment of the invention is discussed below:

The attached drawing shows a diagram of the grain-size distribution of a synthetic zeolite material that qualifies as a suitable blanket material according to the invention. In the diagram, the sum distribution (in %) is plotted against the grain diameters (in μm). It can be seen from the diagram that approximately 80% of the grains measure between 35 and 125 μm in diameter. The close grain-size distribution resulting from the diagram is responsible for the afore-mentioned beneficial properties of the blanket material according to the invention.

The following table shows the grain-size distribution of the zeolite material in terms of numbers:

| | |
|---|---|
| <32 μm | 7.8% |
| >32 μm | 92.2% |
| >45 μm | 79.2% |
| >63 μm | 54.3% |
| >90 μm | 22.5% |
| >125 μm | 4.9% |
| >250 μm | 0.0% |

As for the chemical composition, the blanket material of the above grain-size distribution has a silicon oxide content of approx. 45% and a marginally higher aluminium oxide content. The specific weight of the material ranges from 0.8 and 0.9 g/cm$^3$.

The invention claimed is:

1. A method for treating molten metal contained in a metallurgical vessel, according to which a fine-grained blanket material containing silicon oxide and aluminium oxide is spread over the surface of the molten metal, wherein the blanket material is a synthetic zeolite material which contains essentially equal fractions of silicon oxide and aluminium oxide and which has a close grain-size distribution with less than 20% of the grains measuring less than 30 μm or more than 125 μm in diameter.

2. A method according to claim 1, wherein the grains of the blanket material are essentially sphere-shaped.

3. A method according to claim 1 wherein the blanket material, prior to being spread over the surface of the molten metal, is blended and/or classified to obtain the desired grain-size distribution.

4. A method according to claim 1, wherein the ratio of aluminium oxide to silicon oxide contained in the blanket material is larger than or equal to one.

5. A method according to claim 1, wherein the blanket material contains up to 1% each of titanium oxide, iron oxide, magnesium oxide and calcium oxide.

6. A method according to claim 1, wherein the molten metal is contained in a steel distributor or a steel casting ladle.

7. A method according to claim 1, wherein the blanket powder is applied to an intermediate layer of reactive calcium aluminate slag, which is in direct contact with the molten metal.

8. A method according to claim 1, wherein a carbon source material, e.g. petroleum coke, is added to the blanket material.

9. A method according to claim 1, wherein the blanket material is applied to the surface of the molten metal in plastic polymer bag portion packs.

10. A method according to claim 1, wherein vegetable ash is added to the blanket material.

11. The method according to claim 10, wherein the blanket material is a blend of at least 60% w/w of synthetic zeolite material and up to 40% w/w of vegetable ash.

12. A method according to claim 10, wherein the blanket material has a vegetable ash content of up to 40% w/w, preferably 20% w/w.

13. The method according to claim 10, wherein the vegetable ash is rice chaff ash.

* * * * *